July 18, 1933.  G. DE GENNARO  1,919,095
ARTICLES OF JEWELRY AND METHOD OF MANUFACTURING THE SAME
Filed Aug. 2, 1930
FIG. 1.
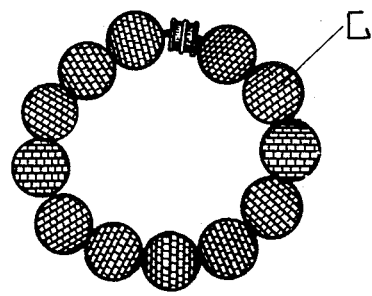
FIG. 1A.
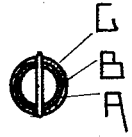
FIG. 2.  FIG. 3.
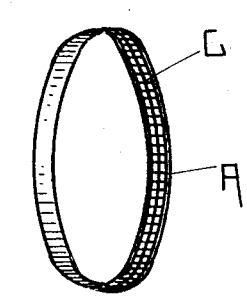 
FIG. 4.
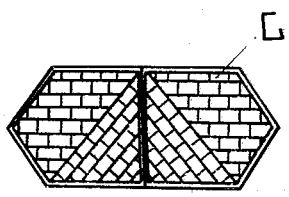
FIG. 5  FIG. 6.  FIG. 7.
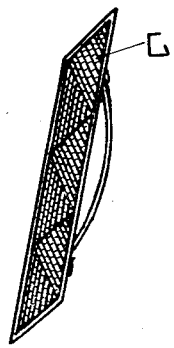 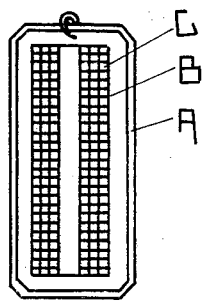 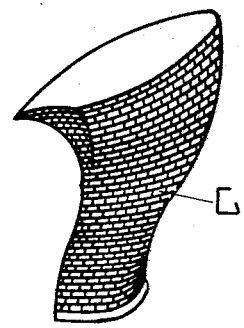
Inventor
Gaétan de Gennaro,
By William C Linton
Attorney.

Patented July 18, 1933

1,919,095

UNITED STATES PATENT OFFICE

GAETAN DE GENNARO, OF PARIS, FRANCE

ARTICLES OF JEWELRY AND METHOD OF MANUFACTURING THE SAME

Application filed August 2, 1930, Serial No. 472,707, and in France August 5, 1929.

The present invention relates to articles of jewelery and to the method of manufacturing the same, and has for its primary object to provide articles of jewelery having a brilliancy similar to that of real diamonds or other stones.

The invention further contemplates to provide articles of jewelery essentially consisting of a base of suitable material having a glass of any color and silvered, cut into facets of any shape raised thereon and disposed to create an intense scintillation and brightness.

Other important objects and advantages of the invention will be in part obvious and in part pointed out hereinafter.

In manufacturing articles of jewelery in accordance with the invention, I take a piece of especially made silvered glass which may be of any color. The glass is made very thin, preferably from two to four-tenths of a millimeter thick, and is slightly curved having a diameter of curvature of one meter, which increases the power of radiation and refraction. In order to prevent the silvered surface of the glass from becoming oxidized, it is advisable to cover it with two films of clear lacquer.

This especially made and prepared glass is then cut into facets of any shape but having sizes not exceeding 1 m/m, and arranged upon a base made of metal, wood, glass or other suitable material.

The glass cut into facets is fixed to the base by means of a resilient and mucilaginous adhesive which is preferably composed of 700 grams of Spanish white and 300 grams of fatty oil thickened down by boiling.

This adhesive medium can only be used for a few days after having been made, and therefore, it is advantageous to manufacture it in small quantities as and when required.

Wood, glass or similar material is used as a base for the glass cut into facets, those parts of the base to be used for garnishing the iridescent facets are preferably engraved or ground by means of a sand blasting jet.

In order that the invention and its use may be readily understood by those skilled in the art, I have, in the accompanying drawing, set out several of the possible embodiments of the same.

In the drawing:—

Figure 1 shows the invention as applied to a necklace;

Fig. 1a is a section through one of the beads in the necklace of Fig. 1;

Figure 2 shows the invention applied to a bracelet;

Figure 3 shows the invention applied to a tie pin;

Figure 4 shows the invention applied to a belt buckle;

Figure 5 shows the invention applied to a brooch;

Figure 6 shows a type of pendant constructed in accordance with the invention having a base of engraved glass and encrusted with iridescent glass facets; and Figure 7 illustrates the invention as applied to shoe heels for evening wear shoes.

Having more particular reference to the drawing wherein like characters of reference will designate corresponding parts throughout, the character A represents the metal or various other materials or substances used as a base for jewels constructed in accordance with the invention.

The reference character B designates the resilient adhesive medium used in the manufacture of my improved jewels while the reference character C indicates the very thin glass curved and silvered and of any suitable color, cut into facets and fixed to the base by means of the adhesive medium hereinbefore described.

It will be understood that the shapes, dimensions and devices that are provided, are subject to modifications, and the application of the invention embraces all sorts of ornamental jewelry, fancy objects and the like.

I claim:

1. The method of manufacturing articles of jewelry comprising cutting a thin slightly curved silvered glass into facets, and arranging said facets upon a base.

2. The method of manufacturing articles of jewelry comprising cutting a thin silvered glass into facets, arranging said glass facets upon a base, and sand blasting the parts of said base garnishing the glass facets.

3. An article of jewelry comprising a base and a thin silvered glass cut into facets arranged upon said base, said silvered glass being slightly curved to increase the radiation and refraction thereof.

GAETAN DE GENNARO.